United States Patent [19]
Mordecai et al.

[11] Patent Number: 5,965,655
[45] Date of Patent: Oct. 12, 1999

[54] MINERAL FILLED MOLDABLE THERMOPLASTIC COMPOSITION

[75] Inventors: Woodie D. Mordecai, Mt. Vernon, Ind.; John B. Yates, Glenmont, N.Y.; Nan-I Liu, Taipei, Taiwan

[73] Assignee: General Electric Company, Pittsfield, Mass.

[21] Appl. No.: 08/674,934

[22] Filed: Jul. 3, 1996

Related U.S. Application Data

[63] Continuation of application No. 08/436,904, May 8, 1995, abandoned, which is a continuation of application No. 08/109,114, Aug. 19, 1993, abandoned.

[51] Int. Cl.⁶ .............................. C08K 3/34; C08K 7/04
[52] U.S. Cl. .................... 524/456; 524/413; 524/423; 524/442; 524/449
[58] Field of Search .................. 524/456, 442, 524/449, 423, 413

[56] References Cited

U.S. PATENT DOCUMENTS

| | | | |
|---|---|---|---|
| 3,764,576 | 10/1973 | Russo | 524/456 |
| 3,846,367 | 11/1974 | Burton | 524/456 |
| 3,907,926 | 9/1975 | Brown et al. | 524/258 |
| 4,111,893 | 9/1978 | Gasman et al. | 260/40 R |
| 4,203,887 | 5/1980 | Goedde et al. | 524/456 |
| 4,254,010 | 3/1981 | Mizuno et al. | 260/40 TN |
| 4,639,486 | 1/1987 | Liu | 524/409 |
| 4,891,397 | 1/1990 | Liu | 524/141 |
| 4,892,901 | 1/1990 | Liu | 524/303 |
| 4,943,606 | 7/1990 | Inoue et al. | 523/457 |
| 5,030,680 | 7/1991 | Wilder et al. | 524/449 |
| 5,091,461 | 2/1992 | Skochdopole | 524/456 |
| 5,326,806 | 7/1994 | Yokoshima et al. | 524/411 |
| 5,389,714 | 2/1995 | Ohtomo et al. | 524/497 |

FOREIGN PATENT DOCUMENTS

| | | |
|---|---|---|
| A-0 130 589 | 1/1985 | European Pat. Off. . |
| 0 358 798 A1 | 3/1990 | European Pat. Off. . |
| A-0 358 798 | 3/1990 | European Pat. Off. . |
| 0 633 295 A1 | 1/1995 | European Pat. Off. . |
| A-61 023 653 | 2/1986 | Japan . |
| A-63 297 460 | 12/1988 | Japan . |
| A-01 038 464 | 2/1989 | Japan . |
| A-1 315 446 | 12/1989 | Japan . |
| 3020359 | 1/1991 | Japan .......................... 524/456 |
| A-3 020 359 | 1/1991 | Japan . |
| 91-167596 | 4/1991 | Japan . |
| A-3 100 062 | 4/1991 | Japan . |
| A-4 053 878 | 2/1992 | Japan . |
| 4-335058 | 11/1992 | Japan . |
| 1 431 916 | 4/1976 | United Kingdom . |

OTHER PUBLICATIONS

Plastics Technology—Jul. 1992; "Fillers—Making RIM Look Good" by Richard Monks.

*Primary Examiner*—Ana Woodward

[57] ABSTRACT

This invention is directed to an improved thermoplastic molding composition having an admixture of thermoplastic polymer or blends thereof and a particular mineral additive having needle like particles and a high aspect ratio of length to diameter. The composition when molded with the final article has improved surface characteristics, even a Class A surface, a lower coefficient of thermal expansion, as well as other improved properties, particularly impact as determined by Dynatup testing. The mineral additive can range from 5 to 70 weight percent. The polymer portion can be a copolyetherimide ester, a copolyether ester, an aromatic polycarbonate, a rubber modified homopolymer, or copolymer of a vinyl aromatic monomer, a polyphenylene ether, a polyamide, and blends thereof or blends with other polymers. The preferred mineral additive is calcium meta silicate, also known as wollastonite.

6 Claims, No Drawings

MINERAL FILLED MOLDABLE THERMOPLASTIC COMPOSITION

This is a continuation of Ser. No. 08/436,904 filed on May 8, 1995, now abandoned which is a continuation of Ser. No. 08/109,114 filed on Aug. 19, 1993, also now abandoned.

FIELD OF THE INVENTION

The present invention is directed to an improved moldable thermoplastic composition having in admixture a particular polymer or blends of particular polymers and a particulate mineral additive. The particulate mineral additive of this invention has needle like particles of a relatively small diameter and having a high aspect ratio of length to diameter. A molded article employing the composition of this invention can have a lower coefficient of thermal expansion (CTE) and/or a high distinctness of image (DOI), which results in a molded article that can have a Class A surface, or an improved surface, as well as other improved properties, particularly impact when compared to other mineral additives.

A Class A surface has been defined in many different ways with no universal definition. One accepted definition is a glossy, smooth and polished surface which should be as smooth as that of a current automobile exterior part made from sheet metal. Another definition is that the visible surface of the article in the finished state is free of exposed glass fibers, flash, sharp edges, visible parting lines, crazing, porosity, hair line cracks, blisters, and obvious repairs. In the present invention, another way of determining a Class A surface is based on the distinctiveness of image (DOI), which is a determination or measurement of reflective light waves.

The compositions of the present invention are useful in many applications, but particularly in automotive exterior body panel applications such as fascia and side cladding parts, and can even find use in such parts as fenders, hoods, panels, trunk lids, door panels, etc. Due to the bake oven temperatures employed during painting of the automobile, as low a coefficient of thermal (CTE) expansion is wanted so as to obtain as close tolerances as possible between molded thermoplastic parts or between plastic and metal parts but still retain all other valuable properties of the thermoplastic parts being used. In other words, the parts would have predictable finished dimensions. In addition, the parts made with the compositions of this invention can have a Class A surface as measured by distinctness of image (DOI), which is a measure of reflective light waves.

DESCRIPTION OF RELATIVE ART

U.S. Pat. No. 5,091,461 discloses and claims an amorphous polymer matrix and an organic filler having improved properties of reduced coefficient of thermal expansion, high falling dart impact resistance and good resistance to heat under load. The composition consists of an aromatic polycarbonate, a rubber modified homopolymer or copolymer, such as acryonitrile-butadiene-styrene (ABS) and an inorganic filler having a particle size of a diameter of less than 44 microns ($\mu$m) and a diameter to thickness ratio of 4 to 24. The inorganic fillers disclosed, however, are clays and talcs. The patent also discloses that the filler's large dimension is the diameter and the thickness is the small dimension showing that the filler is more of a plate shape particle or a flake shaped particle.

With the ever increasing use of plastics in automotive application, particularly external parts thereof, there is a need for plastic parts that have a low coefficient of thermal expansion and stability under the high heat of the baking ovens. This is to avoid excessive expansion of the plastic parts under heat which would result in buckling or misfit such as, for example, a fender or a door of an automobile. Also important is impact resistance, particularly in such parts as fascia and side cladding, which is a plastic strip running along the lower part of the outside of the automobile, as well as in other exterior automotive body parts. It is also important that such molded parts have a Class A surface.

When using such fillers as glass fibers, mica, glass flake, clay, or talc fillers not having the particular particle size of this invention in thermoplastic compositions, one or more of the desired properties is affected, such as DOI is lowered (which is a measure of the surface smoothness), brittleness occurs, poor resistance to impact, little or no CTE reduction, etc.

Therefore, it is an object of this invention to provide an improved thermoplastic molding composition having a lower coefficient of thermal expansion.

Another object of this invention is to provide an improved thermoplastic molding composition which when molded can result in a Class A surface as determined by distinctness of image.

Yet another object of this invention is to provide an improved thermoplastic molding composition which when molded has improved surface characteristics.

Still another object of this invention is to provide an improved thermoplastic molding composition which when molded has improved impact resistance.

DETAILED DESCRIPTION OF THE INVENTION

In accordance with the present invention, there is provided an improved thermoplastic molding composition having, in the molded state, a lower coefficient of thermal expansion (CTE) and a higher distinctness of image (DOI) comprising in intimate admixture of (1) a thermoplastic polymer which may be either a copolyetherimide ester, a polyalkylene terephthalate, an aromatic polycarbonate, a rubber modified homopolymer or copolymer of a vinyl aromatic monomer, a polyphenylene ether, a polyamide, blends thereof, or blends thereof with other polymers, and (2) a fine needle like particulate mineral additive wherein the needle like particles have a mean number average length of about 1.0 $\mu$m to about 50 $\mu$m and a mean number average diameter of about 0.1 $\mu$m to about 10 $\mu$m. The thermoplastic polymer portion of the intimate admixture of this invention is preferable at least about 30 to about 95 weight percent and more particularly at least about 50 to about 95 weight percent. The mineral additive portion of the intimate admixture is preferably about 70 to about 5 weight and more particularly about 50 to about 5 weight percent the weight percents being based on the total weight of the thermoplastic molding composition disclosed herein.

The copolyetherimide esters that may be employed in this invention consist of a multiplicity of recurring long chain ester units and short chain ester units that can be joined through imido-ester linkages. The hard segments of these elastomers consist essentially of multiple short chain ester units represented by the formula:

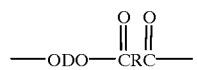

(I)

wherein R is a divalent radical remaining after removal of carboxyl groups from an aromatic dicarboxylic acid having a molecular weight less than about 300, and D is a divalent radical remaining after removal of hydroxyl groups from a diol having a molecular weight less than about 250; provided said short chain ester units amount to about 20–85 percent by weight of said copolyetherimide ester.

The soft segments of these polymers are derived from poly(oxyalkylene diimide) diacid which can be characterized by the following formula:

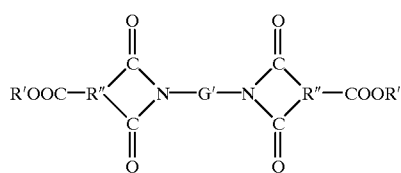

(II)

Wherein, each R" is independently a trivalent organic radical, preferably a $C_2$ to $C_{20}$ aliphatic, aromatic or cycloaliphatic trivalent organic radical; R' is independently hydrogen or a monovalent organic radical preferably selected from the group consisting of $C_1$ to $C_6$ aliphatic and cycloaliphatic radicals and $C_6$ to $C_{12}$ aromatic radicals, e.g., benzyl, much preferably hydrogen; and G' is the radical remaining after the removal of the terminal (or as nearly terminal as possible) amino groups of a long chain ether diamine having an average molecular weight of from about 600 to about 12,000, preferable from about 900 to about 4,000, and a carbon-to-oxygen ratio of from 1.8 to about 4.3.

These long chain ether glycols from which the polyoxyalkylene diamine is prepared include poly (ethylene ether) gylcol; poly(propylene ether) glycol; poly(tetramethylene ether) gylcol; random or block copolymers of ethylene oxide and propylene oxide, including propylene oxide terminated poly (ethylene ether) gylcol; and random or block copolymers of tetrahydrofuran with minor amounts of a second monomer such as methyl tetrahydrofuran. Especially preferred poly(alkylene ether) gylcols are poly(propylene ether) gylcol and poly(ethylene ether) gylcol end capped with poly(propylene ether) gylcol and/or propylene oxide.

The tricarboxylic component is a carboxylic acid anhydride containing an additional carboxylic group or the corresponding acid thereof containing two imide forming vicinal carboxyl groups in lieu of the anhydride group. Mixtures thereof are also suitable. The additional carboxylic group must be esterified and preferably and substantially nonimidizable.

Further, while trimellitic anhydride is preferred as the tricarboxylic component, any of a number of suitable tricarboxylic acid constituents will occur to those skilled in the art.

Generally, the thermoplastic elastomers comprise the reaction product of dimethyltherephthalate, preferably with up to about 40 mole percent of another dicarboxylic acid; 1,4-butanediol, generally, with up to about 40 mole percent of another saturated or unsaturated aliphatic and/or cycloaliphatic diol, and a polyoxyalkylene diamide diacid prepared from a polyoxyalkalene diamine of molecular weight, about 600 to about 12,000, preferable from about 900 to about 4,000, and trumellitic anhydride. Mixtures of two different diols can be employed, such as 1,4-butanediol and 1,4-butene-diol.

The polyetherimide esters described herein and the procedures for their preparation are more fully described in U.S. Pat. Nos. 3,123,192, 3,763,109; 3,651,014; 3,663,655; and 3,801,547 incorporated herein by reference.

The preparation of the copolyetherimide ester is more fully described in U.S. Pat. No. 4,556,705, also incorporated herein by reference.

Another thermoplastic resin that may be employed in the practice of this invention are the copolyether esters which also consist of a multiplicity of recurring long chain ester units and short chain ester units, joined head-to-tail through ester linkages. The long chain ester units are represented by the formula:

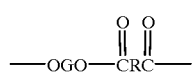

(III)

and the said short chain ester units are represented by the formula:

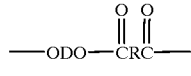

(IV)

wherein G is a divalent radical remaining after the removal of terminal hydroxyl groups from a poly(alkyleneoxide) glycol having a number average molecular weight of about 400 to about 6,000 and a carbon to oxygen atomic ratio of about 2.0–4.3; R is a divalent radical remaining after removal of carboxyl groups from an aromatic dicarboxylic acid having a molecular weight of less than about 300 and D is a divalent radical remaining after removal of hydroxyl groups from a diol having a molecular weight less than about 250; provided said short chain ester units amount to about 25–70 percent by weight of said copolyetherester.

A more detailed description of suitable copolyether esters and procedures for their preparation are further described in U.S. Pat. Nos. 3,023,192; 3,651,014; 3,763,109; 3,766,146; and 4,355,155, which are incorporated herein by reference.

The high molecular weight polyalkylene terephthalates are another thermoplastic resin that may be employed in the practice of the present invention, and they are polyesters derived from an aliphatic or cycloaliphatic diol or mixtures thereof, containing 2 or more carbon atoms and at least one aromatic dicarboxylic acid. The polyester which are utilized herein are available commercially or can be prepared by known techniques, such as by the alcoholysis of esters of the phthalic acid or combination of phthalic acids with an aliphatic diol and subsequent polymerization, by heating the diol with the free acids or with halide derivatives thereof, and similar processes. These are described in U.S. Pat. Nos. 2,465,319 and 3,047,539, and elsewhere.

One class of preferred polyesters employed in the practice of this invention will be of the family consisting of high molecular weight, polymeric aliphatic terephthalates and/or isophthalates having repeating units of the general formula:

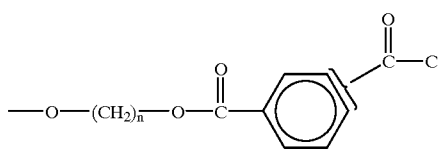

(V)

wherein n is a whole number of from two to four, and mixtures of such esters, including copolyesters of terephthalic and isophthalic acids of up to about 30 mole percent of isophthalic units.

Especially preferred polyesters are poly(ethylene terephthalate) and poly(1,4-butylene terephthalate), although poly(propylene terephthalate) may also be employed herein.

Illustratively, high molecular weight polyesters will have an intrinsic viscosity of at least about 0.4 deciliters/gram and, preferably, at least about 0.7 deciliters/gram as measured in a 60:40 phenol tetrachloroethane mixture at 30° C. At intrinsic viscosities of at least about 1.1 deciliters/gram, there is a further enhancement in toughness of the present compositions.

Also included within the scope of the present invention with respect to the high molecular weight linear polyesters are combinations of polybutylene terephthalates and polyethylene terephthalates. The combinations may be blends thereof, or blends of copolymers of polybutylene terephthalate and polyethylene terephthalate with homopolymers of polybutylene terephthalate, or copolymers of the two polyesters. The preferred combination is a blend of polybutylene terephthalate and polyethylene terephthalate. Although during extrusion of the blend of the two polyesters, some copolymer may be formed, probably in about the 5 weight percent range. Normally, a phosphorous stabilizer is added, particularly a phosphite, in order to inhibit the formation of the copolymer of the polybutylene terephthalate and the polyethylene terephthalate. In the blends thereof, the composition will generally consist essentially of about 30 to 70 and preferably 40 to 60 parts by weight of the polybutylene terephthalate and correspondingly about 70 to 30 parts and preferably about 60 to 40 parts by weight of the polyethylene terephthalate, the parts by weight being based on the total weight of the polybutylene terephthalate and polyethylene terephthalate.

Also contemplated herein are the above polyesters with minor amounts, e.g., from 0.5 to about 2 percent by weight, of units derived from aliphatic acids and/or aliphatic polyols, to form copolyesters. The aliphatic polyols include glycols such as poly(ethylene glycol). These can be made following the teachings of, for example, U.S. Pat. Nos. 2,465,319 and 3,047,539.

Among the units which can be present in the copolyesters are those derived from aliphatic dicarboxylic acids, e.g., of up to and above about 50 carbon atoms, including cycloaliphatic straight and branched chain acids, such as adipic acid, cyclohexanediacetic acid, dimerized $C_{16}$–$C_{18}$ unsaturated acids (which have 32 to 36 carbon atoms), trimerized acids, and the like.

Another preferred class of polyesters employed in the present invention are derived from a cycloaliphatic diol and an aromatic dicarboxylic acid prepared by condensing either the cis- or trans-isomer (or mixtures thereof) of, for example, 1,4-cyclohexanedimethanol with the aromatic dicarboxylic acid so as to produce a polyester having recurring units having the following formula:

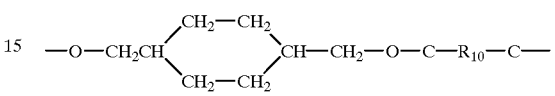

(VI)

wherein the 1,4-cyclohexane dimethanol is selected from the cis- and trans-isomers thereof and $R_{10}$ represents an aryl radical containing 6 to 20 carbon atoms and which is the decarboxylated residue derived from an aromatic dicarboxylic acid.

Examples of aromatic dicarboxylic acids indicated by $R_{10}$ in the formula above include isophthalic or terephthalic acid, 1,2-di(p-carboxyphenyl)ethane, 4,4'dicarboxydiphenyl ether, etc., and mixtures of these. All of these acids contain at least one aromatic nucleus. Fused rings can also be present such as in 1,4 or 1,5 naphthalene-dicarboxylic acids. The preferred dicarboxylic acid is terephthalic acid or mixtures of terephthalic and isophthalic acid.

A preferred polyester may be derived from the reaction of either the cis- or trans-isomer (or a mixture thereof) of 1,4-cyclohexanedimethanol with a mixture of iso- and terephthalic acids. These polyesters have repeating units of the formula:

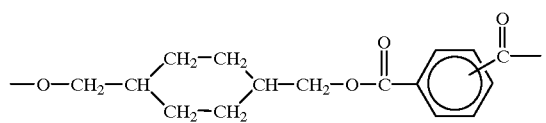

(VI)

Another preferred polyester is a copolyester derived from a cyclohexanedimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having repeating units of the following formula:

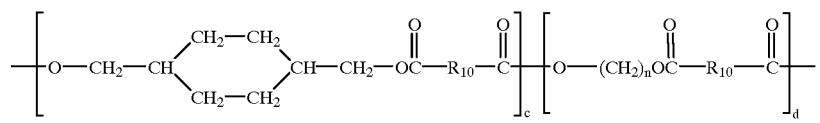

(VIII)

wherein the 1,4-cyclohexanedimethanol is selected from the cis- and trans-isomers thereof, $R_{10}$ is a previously defined, $n$ is an integer of 2 to 4, the c units comprise from about 10 to about 90 percent by weight, and the d units comprise from about 10 to about 90 percent by weight.

The preferred copolyesters may be derived from the reaction of either the cis- or trans-isomer (or mixtures thereof) of 1,4-cyclohexanedimethanol and ethylene glycol with terephthalic acid in, for example, a molar ratio of 1:2:3. These copolyesters have repeating units of the following formula:

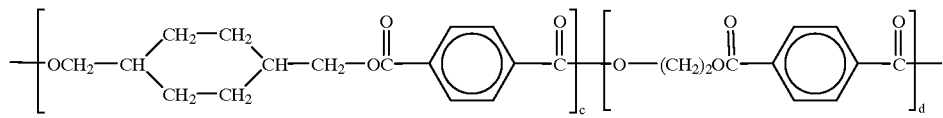

(IX)

wherein c and d are as previously defined.

The polyesters are described herein are either commercially available or can be produced by methods well known in the art such as those set forth in, for example, U.S. Pat. No. 2,901,466.

The preferred cycloaliphatic polyesters are poly(1,4-cyclohexanedimethanol tere/iso-phthalate) and a copolyester of 1,4-cyclohexanedimethanol, ethylene glycol and terephthalic acid and poly(ethylene terephthalate) as previously described.

The polyesters used herein have an intrinsic viscosity of at least about 0.4 and may be as high as about 2.0 dl/g. measured in a 60:40 phenol/tetrachloroethane mixture of similar solvent at 23°–30° C.

The aromatic polycarbonates employed in the instant invention are well known polymers and are disclosed in many U.S. patents such as U.S. Pat. Nos. 2,999,835, 3,038,365, 3,334,154, and 4,131,575, all of which are incorporated herein by reference. Such aromatic polycarbonates are prepared from dihydroxy phenols and carbonate precursors. The polycarbonates suitable for use in the instant invention generally have a number average molecular weight of from about 8,000 to about 80,000 and preferably from about 10,000 to about 50,000 and an intrinsic viscosity (I.V.) of about 0.35 to about 1.0 deciliters per gram (dl/g) as measured in methylene chloride at 25° C.

Suitable dihydroxy phenols employed in the preparation of the polycarbonates include for example 2,2-bis(4-hydroxyphenyl)propane, bis(4-hydroxyphenyl) methane, 2,2-bis(4-hydroxy-3-methylphenyl) propane, 4,4-bis(4-hydroxyphenyl)heptane, 2,2,-(3,5,3',5'-tetrachloro-4,4'-dihydroxyphenyl)propane, 2,2-(3,5,3',5'tetrabromo-4,4'-dihydroxyphenyl)propane, and 3,3'-dichloro-4,4'-dihydroxydiphenyl)methane. Other dihydroxy phenols which are also suitable for use in the preparation of the above polycarbonates are also disclosed in the above references which have been incorporated herein by reference.

It is of course possible to employ two or more different dihydroxy phenols in preparing the polycarbonates of the invention. In addition, branched polycarbonates such as those described in U.S. Pat. No. 4,001,184 can also be utilized in the practice of the instant invention, as well as blends of a linear aromatic polycarbonate and a branched aromatic polycarbonate. The branched polycarbonate resins may be prepared by reacting (i) at least one dihydroxy phenol of the type described herein, (ii) a carbonate precursor, and (iii) a minor amount of a polyfunctional organic compound. The polyfunctional organic compounds used in making the branched polycarbonates are well known in the art and are disclosed, for example, in the U.S. Pat. Nos. 3,525,712; 3,541,049; 3,544,514; 3,635,895; 3,816,373; 4,001,184; 4,294,953, and 4,204,047, all of which are hereby incorporated herein by reference. These polyfunctional organic compounds are generally aromatic in nature and contain at least three functional groups which may be, for example, hydroxyl, carboxyl, carboxylic anhydride, haloformyl, and the like. Some illustrative non-limiting examples of these polyfunctional compounds include trimellitic anhydride, trimellitic acid, trimellityl trichloride, 4-chloroformyl phthalic anhydride, pyomellitic dianhydride, mellitic acid, mellitic anhydride, trimesic acid, benzophenonetetracarboxylic acid, benzophenonetetracarboxylic acid, benzophenone-tetracarboxylic anhydride, and 4,6-dimethyl-2,4,6-tri-(4-hydroxyphenyl) heptene-2. The amount of this polyfunctional organic compound or branching agent used is in the range of from about 0.05 to about 2 mole percent based on the amount of dihydric phenol employed, and preferable from about 0.1 to about 1 mole percent.

The processes for preparing the polycarbonate employed in the instant invention are well known in the art. There are many patents fully describing the preparation of the polycarbonates including those recited previously herein, and as well as U.S. Pat. No. 4,937,130 and U.S. Pat. No. 4,513,037, both of which are incorporated herein by references.

As described in the prior art, a carbonate precursor is employed to prepare the polycarbonates such as a carbonyl halide, a carbonate ester or a haloformate. Typically, the well known carbonate precursor is a carbonyl chloride. A typical carbonate ester is diphenyl carbonate. A typical haloformate is a bishaloformate of a dihydroxyphenol such as the bishaloformate of ethylene glycol. The above carbonate precursors are merely typical or those that can be employed and are not intended to be limiting. Such carbonate precursors are also well known in the art and are listed in the prior art cited previously herein.

The polycarbonate employed herein may also be a copolyestercarbonate as described in U.S Pat. No. 4,430,484 and in the other references cited in U.S. Pat. No. 4,430,484, which is incorporated herein by reference. Preferred polyestercarbonates are those derived from the dihydroxyphenols and carbonate precursors described above and aromatic dicarboxylic acids or their relative derivatives thereof, such as the acid dihalides, e.g. dichlorides. In addition, a mixture of dicarboxylic acids can be employed such as terephthalic acid and isophthalic acid. Further, their respective acid chlorides can also be used. Thus, a useful class of aromatic polyestercarbonates are those prepared from bisphenol-A, terephthalic acid or isophthalic acid or a mixture thereof and a carbonyl chloride also known as phosgene. These copolyestercarbonates are also commonly known as polyphthalate carbonates and are also described in U.S. Pat. No. 4,465,820, incorporated herein by reference.

Rubber modified homopolymers and copolymers of vinyl aromatic monomers that can be employed in the present invention include the rubber modified homopolymers and copolymers of styrene or a-methylstyrene with a copolymerizable comonomer. Preferred comonomers include acrylonitrile which may be employed alone or in combination with other comonomers, particularly methylmethacrylate, methacrylonitrile, fumaronitrile and/or an N-arylmaleimide such as N-phenylmaleimide. Highly preferred copolymers contain from about 70 to about 80 percent styrene monomer and 30 to 20 percent acrylonitrile monomer.

Suitable rubbers include the well known homopolymers and copolymers of conjugated dienes, particularly butadiene, as well as other rubbery polymers such as olefin polymers, particularly copolymers of ethylene, propylene and optionally a nonconjugated diene, or acrylate rubbers, particularly homopolymers and copolymers of alkyl acrylates having from 4 to 6 carbons in the alkyl group. In addition, mixtures of the foregoing rubbery polymers may be employed if desired. Preferred rubbers are homopolymers of butadiene and copolymers thereof with up to about 30 percent by weight styrene. Such copolymers may be random or block copolymers, and, in addition, may be hydrogenated to remove residual unsaturation.

The rubber modified copolymers are preferably prepared by a graft generating process such as by a bulk or solution polymerization or by emulsion polymerization of the copolymer in the presence of the rubbery polymer. In the emulsion polymerization to form graft copolymers of rubbery substrates, it is previously known in the art to employ agglomeration technology to prepare large and small rubber particles containing the copolymer grafted thereto. In the process, various amounts of an ungrafted matrix of the copolymer are also formed. In the solution or built polymerization of a rubber modified copolymer of a vinyl aromatic monomer, a matrix copolymer is formed. The matrix further contains rubber particles having copolymer grafted thereto occluded therein.

A particularly desirable product comprises rubber modified copolymer blend comprising both the mass or solution polymerized rubber modified copolymer and additional quantities of an emulsion polymerized and preferably agglomerated rubber modified copolymer containing a bimodal particle-sized distribution. A most preferred rubber modified copolymer comprises a butadiene rubber modified copolymer. Butadiene rubber modified copolymers of styrene and acrylonitrile are referred to in the art as ABS resins.

The polyphenylene esters employed in the practice of this invention are a well known class of compounds sometimes referred to as polyphenylene oxides. Examples of suitable polyphenylene ethers and processes for their preparation can be found in U.S. Pat. Nos. 3,3086,874; 3,3086,875; 3,257,357; and 3,257,358 which are incorporated by reference. Compositions of the present invention will encompass homopolymers, copolymers and graft copolymers obtained by the oxidative coupling of phenolic compounds. The preferred polyphenylene ethers used as base resins in compositions of the present invention will be comprised of units derived from 3,6-dimethyl phenol. Also contemplated are PPE copolymers comprised of units derived from 2,6-dimethyl phenol and 2,3,6-trimethyl phenol.

A particularly useful polyphenylene ether would be poly(2,6-dimethyl-1,4-phenylene ether) having an intrinsic viscosity (I.V.) greater than, approximately 0.10 dl/g as measured in chloroform at 25° C. The I.V. will typically be between 0.30 and 0.60 dl/g.

The polyamide resins useful in the practice of the present invention are known as nylons, and are characterized by the presence of an amide group (—CONH—). Nylon-6 and nylon 6,6 are the generally preferred polyamides and are available from a variety of commercial sources. The polyamides may be either amorphous or crystalline polyamides.

Typical examples of the polyamides or nylons, as these are often called, include for example polyamides 6, 6/6, 11, 12, 6/3, 6/4, 6/10, and 6/12, as well as polyamides resulting from terephthalic acid and/or isophthalic acid and trimethyl hexamethylene diamine, polyamides resulting from adipic acid and meta xylylenediamines, polyamides resulting from adipic acid, and metaxylylenediamines, polyamides resulting from adipic acid, azelaic acid and 2,2-bis-(p-aminocyclohexyl)propane and polyamides resulting from terephthalic acid and 4,4'-diamino-dicyclohexylmethane. Mixtures and/or copolymers of two or more of the foregoing polyamides or prepolymers thereof, respectively, are also within the scope of the present invention. Preferred polyamides are the polyamides 6, 6/6, 11, and 12, most preferably polyamide 6/6.

It is also to be understood that the use of the term "polyamides" herein and in the appended claims is intended to include the toughened or super tough polyamides. Super tough polyamides, or super tough nylons, as they are more commonly known, are available commercially, e.g. from E. I. duPont under the tradename Zytel ST, or may be prepared in accordance with a number of U.S. Patents, including, among others, Epstein U.S. Pat. No. 4,174,358; Novak U.S. Pat. No. 4,474,927; Roura U.S. Pat. No. 4,346,194; and Joffrion U.S. Pat. No. 4,251,644, all of which are herein incorporated by reference. These super tough nylons are prepared by blending one or more polyamides with one or more polymeric or copolymeric elastomeric toughening agents. Suitable toughening agents are disclosed in the above-identified U.S. Pat. Nos., as well as in Caywood, Jr. U.S. Pat. No. 3,884,882 and Swiger U.S. Pat. No. 4,147,740 and Gallucci et al., "Preparation and Reactions of Epoxy-Modified Polyethylene", J. APPL. POLY. SCI. V. 27, pp. 425–437 91982) all incorporated herein by reference. Typically, these elastomeric polymers and copolymers may be straight chain or branched, as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

As stated previously, the thermoplastic composition of this invention may also comprise blends of the above polymers. An example of such blends may be blends of an aromatic polycarbonate and an ABS in a range of about 30 to about 70 weight percent of polycarbonate and about 70 to about 30 weight percent of ABS based on the weight of the polymers employed. In another system, a blend of the polycarbonate and a polyalkylene terephthalate (polybutylene terephthalate) may also be employed herein. Still another blend that may be employed in the practice of this invention is a blend of a polyphenylene ether and a polyamide. Yet another blend may be that of copolyetherimide ester or a copolyether ester and a polyalkylene terephthalate (PBT), or a blend of a polycarbonate, a polybutylene terephthalate (PBT) and ABS. The above blends are merely some of the typical blends that may be employed in the practice of this invention and other blends will become obvious to those skilled in the art in view of the disclosure herein.

In addition, as stated previously, blends of the above polymers with other polymers are also included within the scope of the present invention. For example, blends of polyphenylene ether and a styrene polymer may be employed, such as NORYL® resin sold by General Electric Company. Copolymers of styrene and methyl-methacrylate may also be used herein with any of the polymers described above. Polyethylene and polycarbonate is another blend that may be employed herein. Again, these blends are merely representative of some of the blends that may be employed herein and other such blends will be obvious to those skilled in the art in view of the teachings disclosed herein.

The mineral additive employed in the practice of this invention has needle like particles. While any such mineral additive may be employed herein, the particles should have the particle size distribution as disclosed herein. Preferably, the mineral filler consists essentially of calcium meta silicate, which is also referred to as calcium silicate, and more commonly as wollastonite. However, since the mineral is mined, other ingredients may also be present in wollastonite, such as trace amounts of aluminum oxide, magnesium oxide and/or iron oxide. Although wollastonite is identified as calcium meta silicate, there may be some free silicon dioxide present therein as well. The mineral filler of this invention consists essentially of needle like particles having a mean number average length of about 1.0 $\mu$m to about 50 $\mu$m and and a mean number average diameter of about 0.1 $\mu$m to about 10 $\mu$m. Preferably, at least 80 percent of the needle like particles of the mineral additive have a length of about 5 $\mu$m to about 40 $\mu$m, and more specifically at least 50 percent of the needle like particles have a length of about 5 $\mu$m to about 25 $\mu$m. This results in a number average aspect ratio of length to diameter of up to about 6 and preferably ranging from less than about 1.0 to about 10.

The preferred mineral additive employed in the present invention is wollastonite or also known as calcium meta silicate, having the particular particle morphology disclosed previously. Wollastonites are well known minerals and are used as fillers in thermoplastics. However, the known and previously employed wollastonites have a mean number average length of about 90 $\mu$m, and a mean average diameter of about 15 $\mu$m or greater. Also, at least 50 percent of the particles have a length ranging from about 15 $\mu$m to over 50 $\mu$m, with at least 80 percent of the particles ranging from 15 to about 150 $\mu$m.

It has also been found that when the composition of this invention is injection molded, the mineral additive particles may undergo a breaking or shearing, which may result in a decrease of the aspect ratio. Even though this shearing may occur, the mean average aspect ratio would probably still be within the range of less than about 1 to about 10.

The object of this invention is to provide an improved thermoplastic molding composition as described previously having the advantage of providing molded articles having a lower CTE and a high or improved DOI. It has also been found that certain compositions of this invention are ductile compared to previously commonly employed wollastonites, as demonstrated in the Examples. It has further been unexpectedly discovered that the use of the particular wollastonite of this invention may also result in a higher DOI, as compared in previously employed wollastonites or other fillers. For example, as shown in the Examples, the use of the wollastonite of this invention greatly increased the DOI of the molded article over previously known fillers. In addition, the mineral filler herein disclosed also provides greater impact strength as determined by the Dynatup impact test, even though brittle breaks may occur. This is demonstrated in the Examples, wherein higher energy is required to break or pierce the sample, again in comparison to previously known wollastonite. This represents that even though the break may be brittle, greater impact is necessary in order to achieve breakage. The results show that a substantial greater energy is required, both at room temperature and at subzero temperatures. It is surprising that the substantial unexpected property increases that are achieved with the particular mineral additives of this invention. Even when employed in combination with other fillers, which are described hereinafter, dramatic increases in properties can be achieved.

The mineral additive of this invention may act as a filler or it may act as a reinforcing agent or it may act as a combination of both. The particular mineral additive may also preferably have a surface treatment on the particles such as with a silane surface treatment such as an alkoxy silane or other type of coupling agent such as a titinate or zirconate for example. However, the critical feature of the present invention is that by employing the particular mineral additive disclosed herein, the results achieved as shown in the Examples are not achieved with previously known fillers such as carbon fibers, mica, talc, glass fibers, and even previously known wollastonites, other than the wollastonite having the particle morphology disclosed in this invention.

In addition, it has also been unexpectedly discovered that articles molded from the improved composition of this invention may have a Class A surface. The test procedure employed in this invention for determining Class A surface is the distinctness of image (DOI) test procedure (as later described herein), which is a determination of the percentage of reflective light waves that are reflected from the surface of the molded article. The higher the percentage, the smoother is the surface. In the present invention, articles molded with the composition herein disclosed can have a DOI of greater than 95% as compared to lower DOI's for the same composition employing previously known fillers or reinforcing agents when molded under the same conditions. As is understood by those skilled in the art, the composition itself is an important and critical factor in obtaining a Class A surface. However, properly prepared surfaces of the mold employed in injection molding or whatever mold is employed in molding are also a factor in achieving a Class A surface along with the factor of the composition. With a dull or slightly imperfect mold surface, one may still obtain a Class A surface with an article molded from the composition of this invention. On the other hand, a roughened mold surface may well not produce a Class A surface on an article molded from the composition of this invention, regardless of the composition. All things being equal, i.e. a properly polished mold surface, molded articles molded from the composition of this invention can have a Class A surface as determined by the DOI.

In addition, the composition of this invention may include other additives such as impact modifiers, heat and light stabilizers, flame retardants and other additives well known to those skilled in the art. An impact modifier can be an important additive where increased or improved impact resistance is wanted. While many known impact modifiers may be employed herein providing that the impact modifier employed enhances the impact properties of the molded article substantially without affecting the other physical properties of the composition of this invention, particularly useful are the rubbery shell-core type of impact modifiers. One type of shell-core impact modifier is the all acrylic modifier, i.e. one having a polyacrylate core such as polybutyl acrylate with a shell of a methyl methacrylate such as styrene methyl methacrylate or an acrylonitrile methyl methacrylate shell. Another type of shell-core impact modifiers is one having a polybutadiene core that is preferably a crosslinked polybutadiene core with an acrylate shell such as the same types of acrylate shells disclosed above. Sometimes it is advantageous to use linking compounds or linking monomers during the polymerization of the impact modifiers in order to link or bind the shell to the core. Another type of rubbery impact modifier that may be employed herein is styrene-butadiene-tyrene triblock copolymers, or styrene-ethylene/butylene-styrene triblock copolymers or styrene ethylene/propylene-styrene diblock copolymers. These are available from Shell Chemical which is sold under the trademark Kraton. The amount of impact modifier that may be optionally employed herein is about 0.5 to about 25 parts by weight based on the weight of the polymer, the mineral additive and the impact modifier. Such impact modifiers as described above are available commercially from various polymer manufacturers.

Also contemplated as part of this invention are blends of mineral additives such as blends of the mineral additive of this invention with other fillers such as mica, talc, carbon black, or other minerals not having the needle like morphology of the mineral additive of this invention Even the blend of minerals produces improvement in such properties as DOI and/or the CTE, i.e. by lowering the CTE. For example, a blend of the polymers of this invention with just mica demonstrates (not with the mineral filler of this invention) that a low DOI is obtained on molded parts. However, when adding wollastonite having the particle morphology disclosed in this invention to a blend of a polymer and mica, the DOI is dramatically improved, and the CTE is lowered. This can also occur with blends of the mineral additive of this invention and other mineral additives. The use of such blends can produce lower CTE and better or improved DOI, as demonstrated in the Examples. The amount of other mineral additive that can be blended with the mineral additive of this invention should be that amount that does not affect the increased properties of CTE, DOI, impact, etc. obtained with the mineral additive of the invention. In effect, one can use a lower cost mineral additive in place of part of the mineral additive of this invention without significantly affecting the increased properties afforded by the instant additive disclosed herein. Preferably, the amount of mineral additive of this invention should be about at least 50 percent by weight of the additive, and, more particularly, about at least 70 percent by weight with the balance being such other mineral additive not of the needle like particles disclosed herein.

Also included within the scope of this invention, is the use of a blend of needle like particles having the morphology of the mineral additive of this invention.

DESCRIPTION OF THE PREFERRED EMBODIMENTS

The following Examples are set forth to illustrate the present invention and are not to be construed as limiting the scope of this invention thereto. Unless otherwise indicated, all parts and percentages are on a weight basis.

EXAMPLES 1–4

All ingredients were dry blended in a laboratory tumbler. The blend was then fed to a twin screw 58 mm. co-rotating intermeshing extruder. The temperature of the extruder was at about 480° F. to about 520° F. flat temperature profile along the extruder barrel, depending on the polymer used, and one skilled in the art would well know the temperature to use. The die temperature through which the composition was extruded was about the same temperature as the extruder barrel temperature, namely about 480° F. to about 500° F. The extrudate was pelletized and dried at a temperature of about 230° F. for 2 hours in a hot air circulating oven. The pelletized compositions were then molded into test specimens using an 80 ton Van Dorn injection molding machine. The temperature of the molding machine was at about 480° F. to a about 500° F. with a mold temperature of about 150° F., again depending on the polymer employed and would well be within the knowledge of one skilled in the art. The size of the test specimens varied depending on the test to be run. For notched IZOD impact, the tests specimens were about 3" long by ½" wide by ⅛" thick and were tested in accordance with ASTM D630A. For Dynatup impact testing and paint testing, the test specimens molded were about 4" in diameter by about ⅛" thick. The Dynatup test was performed under ASTM test procedure D3763-86 using the Dynatup impact testing equipment by General Research Instruments. Briefly, the test procedure involves subjecting samples to a falling dart impact. The dart is about a 0.5" diameter rod about 1.5" long and has a rounded, blunt end, which is the end that impacts upon the sample. The molded sample is clamped in a holding device. The date is on a vertical sled or shaft, with weights added for energy impact determination. The test is designed to force failure of the sample in order to determine the type of failure occurring. The average velocity of the falling dart was about 11.3 feet per second, and the impact energy was 100 foot-pounds, with a drop height of two feet.

In the Dynatup impact test, the energy absorbed by the sample by the falling dart is plotted on a graph from the time the dart first hits the sample until it punctures through the sample. E(max) is the maximum energy absorbed by the sample at the peak of the graph, which is a chart of the energy absorbed by the sample. E(tot) is the total energy absorbed over the range of time the dart first hits the sample until it punctures through the sample. Generally, E(max) and E(tot) are the average of several samples for each formulation tested, as shown in the tables.

The DOI test procedure was developed to determine the effect fillers in materials may have on specular gloss of the topcoat paint when no primer, sealer, surfacer, etc. is used. Some automobile parts are so prepared with topcoat only. Since DOI will vary depending on the paint color, a high gloss black automotive paint is used as the standard. This paint yields a DOI of 99+% when properly applied to unfilled materials, i.e. plastics without inorganic fillers such as glass, mica, clay, etc. Samples are all painted together with an automatic paint spraying machine (Spraymation #310740) to insure proper uniformity and repeatability of application parameters (flash time, paint thickness, etc.). When the paint is cured, the DOI is measured in several locations on each sample with a meter. An ATI model #1792 special gloss meter is used. The results are reported in the Tables below.

The wollastonite of this invention employed in the Examples was NYGLOS wollastonite, having an average mean diameter based on number average of less than about 4.5 μm and an average mean length of about 24 μm. The wollastonite of the prior art employed in the Examples was NYAD G wollastonite, having an average mean diameter based on number average of about 16 μm and an average mean length of about 90 μm. Both wollastonites are from NYCO Company. The morphology of the NYGLOS and NYAD G wollastonites was determined on the raw material, i.e. before compounding with the particular resins and other additives to prepare the formulations set forth in the Tables. The method employed was light microscopy. Photomicrographs were made using transmitted bright field illumination on a Zeiss Photomicroscope interfaced to a Zeiss IBAS image analysis system. From the photomicrographs, particles were measured and number average mean results were obtained as reported above. Particle size distribution was also determined.

The results of the above tests were as follows:

TABLE 1

| (parts) INGREDIENTS (by wt.) | 1 | 2 | 3 | 4 |
|---|---|---|---|---|
| PEIE (30) | 37.2 | 37.2 | 37.2 | 37.2 |
| PBT | 30.0 | 30.0 | 30.0 | 30.0 |
| IMP | 12.0 | 12.0 | 12.0 | 12.0 |
| Stabilizer Package | 0.8 | 0.8 | 0.8 | 0.8 |
| NYGLOS | 20.0 | 0 | 10.0 | 0 |
| Mica | 0 | 0 | 10.0 | 10.0 |
| NYAD G | 0 | 20.0 | 0 | 10.0 |
| PROPERTIES Notched, Izod foot-lbs/inch | | | | |
| @ rm. temp. | 10.8 | 7.2 | 4.1 | 4.3 |
| @ −30° C. | 3.1 | 3.1 | 2.1 | 2.2 |
| Dynatup | | | | |
| @ rm. temp. | — | — | 2D | 1D/1DSC |
| $^E$MAX/$^E$TOT | | | 16/18 | 14/16 |
| @ −30° C. | 5D | 1B/4* | 5B | 2B/3* |
| $^E$MAX/$^E$TOT | — | — | — | — |
| DOI (%) | 99 | 73 | 87 | 73 |
| CTE (in./in./° F. × $10^{-5}$ flow direction) | 3.24 | 6.47 | 5.06 | 4.97 |

PEIE (30) - copolyetherimide ester - LOMOD ® JE630 by General Electric Company contains 30% by weight of polyethylene glycol
PBT - polybutylene terephthalate - VALOX ® 315 by General Electric Company
IMP - impact modifier - BLENDEX ® 338 ABS (70 wt. % butadiene, 22 wt. % styrene, 8 wt. % acrylonitrile) by General Electric Company
Notched Izod - ASTM D630A
Dynatup - ASTM D 3763-86
Stabilizer Package - tris nonyl phosphate (TNPP), Irganox 1010 (a phenolic anti oxident by Ciba Geigy, a thio ester and an epoxy)
D - ductile break
B - brittle break
* - star break
Ductile break means penetration of the sample without cracks or break-away fragments.
Brittle means penetration of the sample with cracks and break-away fragments.
Star break means penetration of the sample with radial cracks like a star
Mica - Harco White Muscovite mica

EXAMPLES 5–10

Examples 1–4 were repeated, except that the ingredients and compositions were as reported in Table 2 below:

TABLE 2

| (parts) INGREDIENTS (by wt.) | 5 | 6 | 7 | 8 | 9 | 10 |
|---|---|---|---|---|---|---|
| PEIE (30) | 44.5 | 44.5 | 21.7 | 21.7 | 0 | 0 |
| PEIE $^{(1)}$ | 0 | 0 | 0 | 0 | 74.3 | 74.3 |
| PBT | 37.7 | 37.7 | 17.5 | 17.5 | 0 | 0 |
| IMP | 12.0 | 12.0 | 10.0 | 10.0 | 0 | 0 |
| NYGLOS | 0 | 5.0 | 50.0 | 0 | 0 | 25.0 |
| NYAD G | 5.0 | 0 | 0 | 50.0 | 25.0 | 0 |
| Stabilizer Package | 0.8 | 0.8 | 0.8 | 0.8 | 0.7 | 0.7 |
| PROPERTIES Notched Izod (ft-lbs/in) | | | | | | |
| @ rm. temp. | 8.7 | 9.4 | 1.9 | 2.5 | 5.3 | 5.3 |
| @ −30° C. | 4.6 | 9.4 | 1.3 | 1.7 | 4.0 | 2.7 |
| Dynatup | | | | | | |
| @ rm. temp. $^E$MAX/$^E$TOT | — | — | — | — | — | — |
| @ −30° C. | 5B | 5D | 4B/1* | 5* | 5B | 5D |
| $^E$MAX/$^E$TOT | 18.4/21.91 | 16.9/31.61 | 1.7/7.0 | 2.5/9.8 | — | — |
| DOI (%) | 85 | 98 | 91 | 44 | 73 | 99 |
| CTE (in/in/° F. × $10^{-5}$ flow direction) | 5.95 | 5.42 | 2.37 | 4.27 | 5.99 | 6.25 |

PEIE $^{(1)}$ - copolyetherimide ester - LOMOD ® J1013 by General Electric Company
All other ingredients and tests run are the same as Table 1, except the Stabilizer Package of Examples 9 and 10 do not contain a thio ester.

EXAMPLES 11–16

Examples 1–4 were repeated, except that the formulations employed herein were as reported in Table 3, along with the results obtained.

TABLE 3

Examples 11–16

| (parts) INGREDIENTS (by wt.) | 11 | 12 | 13 | 14 | 15 | 16 |
|---|---|---|---|---|---|---|
| PET | 32.1 | 32.1 | 15.0 | 15.0 | 0 | 0 |
| PBT | 0 | 0 | 30.0 | 30.0 | 74.3 | 74.3 |
| PC | 32.0 | 32.0 | 19.1 | 19.1 | 0 | 0 |
| IMP | 15.0 | 15.0 | 15.0 | 15.0 | 0 | 0 |
| NYGLOS | 20.0 | 0 | 0 | 20.0 | 25.0 | 0 |
| NYAD G | 0 | 20.0 | 20.0 | 0 | 0 | 25.0 |
| Stabilizer Package | 0.9 | 0.9 | 0.9 | 0.9 | 0.7 | 0.7 |
| PROPERTIES Notched Izod (ft-lbs/in) | | | | | | |
| @ rm. temp. | 1.7 | 1.5 | 4.2 | 1.9 | 0.9 | 0.7 |
| @ -30° C. | 0.7 | 0.9 | 0.6 | 0.6 | 0.7 | 0.7 |
| Dynatup | | | | | | |
| @ rm. temp. | 2B | 2B | 2B | 2B | 1B | 1B |
| $^E$MAX/$^E$TOT | 31/32 | 6/6 | 19/21 | 27/33 | 2.0/2.0 | 1.5/1.6 |
| @ -30° C. | 5B | 5B | 5B | 5B | — | — |
| $^E$MAX/$^E$TOT | 7.0/7.6 | 1.1/4.9 | 1.1/4.3 | 1.9/3.8 | — | — |
| DOI (%) | 98 | 46 | 49 | 77 | 99 | 73 |
| CTE (in/in/° F. × 10$^{-5}$ flow direction) | 3.02 | 5.00 | 5.99 | 3.99 | 3.64 | 4.69 |

PET - polyethylene terephthalate-DuPont's CRYSTAR 3948 having an IV 0.57 dl/gram
PC - polycarbonate - LEXAN ® 140 resin by General Electric Company
IMP - impact modifier - KM 330, a shell core polyacrylate by Rohm & Haas Co.
All other ingredients and tests run are the same as Table 1, except Examples 15 and 16 do not contain thio ester in the Stabilizer Package.

EXAMPLES 17–24

Examples 1–4 were repeated, except that the formulations employed herein were as reported in Table 4, along with the results.

TABLE 4

Examples 17–24

| (parts) INGREDIENTS (by wt.) | 17 | 18 | 19 | 20 | 21 | 22 | 23 | 24 |
|---|---|---|---|---|---|---|---|---|
| PBT | 59.3 | 59.3 | 0 | 0 | 0 | 0 | 0 | 0 |
| ABS | 15.0 | 15.0 | 12.0 | 12.0 | 0 | 0 | 19.1 | 19.1 |
| SAN | 0 | 0 | 16.0 | 16.0 | 0 | 0 | 60.0 | 60.0 |
| PC | 0 | 0 | 51.25 | 51.25 | 79.1 | 79.1 | — | — |
| NYGLOS | 25.0 | 0 | 20.0 | 0 | 20.0 | 0 | 20.0 | — |
| NYAD G | 0 | 25.0 | 0 | 20.0 | — | 20.0 | — | 20.0 |
| Stabilizer Package | 0.7 | 0.7 | 0.75* | 0.75* | 0.9 | 0.9* | 0.75* | 0.75* |
| PROPERTIES Notched Izod (ft lbs/in) | | | | | | | | |
| @ rm. temp. | 1.0 | 1.2 | 3.4 | 2.2 | — | — | — | — |
| @ -30° C. | 1.0 | 1.0 | 1.1 | 1.3 | — | — | — | — |
| Dynatup | | | | | | | | |
| @ rm. temp. | 2B | 2B | 2B | 2B | 5B | 5B | 5B | 5BP |
| $^E$MAX/$^E$TOT | 13/13 | 2/2 | 25/26 | 2/13 | 2.7/3.0 | 1.4/1.5 | 1.4/1.7 | 3.8/5.2 |
| @ -30° C. | 5B | 5B | 5B | 5B | 5B | 5B | 5B | 5BP |
| $^E$MAX/$^E$TOT | 1.6/3.1 | 2.1/3.3 | 3.4/4.0 | 5.6/10.7 | 2.1/2.2 | 0.99/1.1 | 1.6/1.9 | 2.9/3.5 |
| DOI (%) | 99 | 88 | 94 | 72 | 89 | 70 | 70 | 58 |
| CTE (in/in/° F. × 10$^{-5}$ flow direction) | 3.63 | 3.85 | 2.25 | 3.00 | 2.17 | 2.69 | 2.91 | 3.81 |

ABS - BLENDEX ® 338 - ABS (70 wt. % butadiene, 22 wt. % styrene, 8 wt. % acrylonitrile) by General Electric Company
SAN - styrene acrylonitrile copolymer SAN 580 by General Electric Company
BP - brittle punch out
PC - polycarbonate - LEXAN ® 140 resin by General Electric Company
All other ingredients and tests run are the same as Table 1, except that Examples 17 and 18 do not contain a thio ester in the Stabilizer Package

TABLE 4-continued

Examples 17–24

| (parts) INGREDIENTS (by wt.) | 17 | 18 | 19 | 20 | 21 | 22 | 23 | 24 |
|---|---|---|---|---|---|---|---|---|

*Stabilizer Package - Irganox 1076 (a phenolic antioxident by Ciba Geigy)/pentaertherytol tetrestearate/ IRGAFOS 168

EXAMPLES 25–33

Several blends were prepared, each of which contained 49 parts by weight poly(2,6-dimethyl-1,4-phenylene ether) which had an intrinsic viscosity of, approximately, 0.45 dl/g as measured in chloroform at 25° C., 0.70 part citric acid monohydrate compatibilizing agent, 10 parts rubber modifier (Kraton, G-1651 Shell Chemical, a styrene-ethylene/ butylene-styrene triblock copolymer), 0.30 part Irganox 1076 hindered phenol stabilizer, 0.10 part KI stabilizer, and 10 parts of a specified nylon.

The foregoing blended components of the composition were fed to the feedthroat of a 30 mm. Werner & Pfleiderer twin screw extruder which was fitted with a downstream addition port. The extruder was set at 550° F., and was fitted with a downstream addition port.

An additional 31 parts of a nylon component specified in the table were fed at the downstream addition port.

The resulting extruded strand was chopped into pellets, dried and molded into ASTM test parts in a Newbury 3 ounce injection molder having a 550° F. set temperature profile and a mold set temperature of 150° F. All test results described in Table 1 were performed in accordance with ASTM test specifications.

The polyamide component designated as nylon 6,6 was NP-10,000 from Nylon Polymers. The nylon 6 was Nycoa 471 from Nylon Corp. of America.

The filled compositions were prepared in the same fashion as set forth in the previous paragraph, Examples, namely Dynatup Impact, coefficient of thermal expansion (CTE), DOI and tensile elongation. Tensile elongation was determined in accordance with ASTM test procedure D638. The other test procedures are as described in Examples 1–4.

TABLE 6

Examples 34–39 AND 40C–45C

| EX | | D | L | DOI | CTE |
|---|---|---|---|---|---|
| 40C | Glass Fiber - A | 10 | 300 | 70 | — |
| 41C | Wollastonite | 8 | 80 | 80 | — |
| 42C | PMF 204C | 5 | 50 | 80 | — |
| 43C | Milled glass | 7 | 110 | 80 | — |
| 44C | Milled glass | 4 | 110 | 80 | — |
| 45C | Milled glass | 13 | 65 | 90 | — |
| 34 | Milled ceramic | 3 | 15 | 99 | — |
| 35 | $CaSO_4$ | 2 | 20 | 99 | — |
| 36 | Poly(calcium terephthalate) | 0.5 | 15 | 99 | 5.0 |
| 37 | Titanate | 1.0 | 50 | 99 | 4.4 |
| 38 | $TiO_2$ | 0.16 | 1.7 | 99 | 6.5 |
| 39 | Norphil | 0.4 | 1.6 | 85 | — |

The above examples were materials tested for their suitability for painted automotive bodypanels. D means number average diameter of the fibers. L means number average length of the fibers. The compositions comprised 70% by weight polybutylene terephthalate, 20 percent by weight polyetherimide ester resin, and 10 percent by weight reinforcing fiber based on the entire weight of the composition.

TABLE 5

Examples 25–33

| PROPERTIES | 25 | 26 | 27 | 28 | 29 | 30 | 31 | 32 | 33 |
|---|---|---|---|---|---|---|---|---|---|
| Filler | 0 | Nicron 500 talc silane treated | Polyfil EDL Clay | NYGLOS silane treated | NYGLOS no treatment | Talc MP 12-50 no treatment | PPG 3634 glass fibers | Clay EDL 300-L | M-XF mica |
| Notched Izod (ft-lbs/in) | | | | | | | | | |
| @ rm. temp. | 5.6 | 0.7 | 0.9 | 2.2 | 2.4 | 1.0 | 0.9 | 2.0 | 1.0 |
| @ −30° C. | 2.3 | 0.7 | 0.6 | 1.5 | 1.6 | 0.6 | 0.6 | 1.5 | 0.8 |
| Tensile Elongation | 98.0 | 7.0 | 8.0 | 54.0 | 48.0 | 8.0 | 0.9 | 44.0 | 12.0 |
| CTE | 4.4 | 3.2 | 3.2 | 3.6 | 4.0 | 3.3 | 2.4 | 3.8 | 3.6 |
| DOI | 97.0 | 99.0 | 97.6 | 99.0 | 99.0 | 99.0 | 96.6 | 94.3 | 89.0 |
| Dynatup (ft-lbs) | | | | | | | | | |
| @ rm. temp. | 45.0 | 2.0 | 3.0 | 33.0 | 30.0 | 3.0 | 3.0 | 22.0 | 1.0 |
| @ −22° C. | 35.0 | 1.0 | 2.0 | 11.0 | 14.0 | 1.0 | 3.0 | 7.0 | 1.0 | except the filled compositions consisted of a blend of 40 parts of the poly(2,6dimethyl-1,4-phenylene ether), 36 parts of the nylon 6/6, 10 parts of the Kraton G-1651, 0.7 parts of citric acid, and 14 parts of the filler, which is as set forth in Table 5 below with the results of the tests run on the A DOI value of at least 95% is necessary for a composition to be suitable for the automotive body panels, preferably having a DOI of at least 99%. Examples 40° C.–45° C. are comparative examples. Examples 34–38 exhibit sufficiently high DOI values. DOI is measured after exposure of the composition to 280° F. Preferably the coefficient of thermal expansion is between $3\times10^{-5}$ inches/inch/°F. and $5\times10^{-5}$ inches/inch/°F., more preferably between $4\times10^{-5}$ inches/inch/°F. and $5\times10^{-5}$ inches/inch/°F.

Therefore, in the present invention, it is to be understood by those skilled in the art that various changes may be made in the particular embodiments described above without departing from the spirit and scope of the invention as defined in the appended claims

What is claimed is:

1. An improved thermoplastic molding composition comprising in admixture (1) a thermoplastic polymer selected from the group consisting of a copolyetherimide ester, a copolyether ester, a polyalkylene terephthalate, an aromatic polycarbonate, a rubber modified homopolymer or copolymer of a vinyl aromatic monomer, a polyphenylene ether, and blends thereof, and (2) a calcium meta silicate particulate mineral having needle like particles wherein at least 50 percent of the needle like particles have a number average mean length of about 5 μm to about 25 μm and a number average mean diameter of about 0.1 μm to about 10 μm wherein said composition is suitable for molding into articles having a Class A finish.

2. The composition of claim 1 comprising about 95 to about 30 weight percent of the thermoplastic polymer (1) and correspondingly about 5 to about 70 weight percent of the particulate mineral additive (2), based on the weight of components (1) and (2).

3. The thermoplastic molding composition of claim 1, wherein said particulate mineral has a number average aspect ratio of length to diameter of up to about 6.

4. The thermoplastic molding composition of claim 1 wherein the thermoplastic polymer (1) is polybutylene terephthalate.

5. An improved thermoplastic molding composition comprising a polyalkylene terephthalate, and (2) a calcium meta silicate particulate mineral having needle like particles wherein at least 50 percent of the needle like particles have a number average mean length of about 5 to about 25 μm and a number average mean diameter of about 0.1 μm to about 10 μm.

6. The composition of claim 5 consisting essentially of about 95 to about 30 weight percent of (1) and correspondingly about 5 to about 70 weight percent of (2), based on the weight of components (1) and (2).

* * * * *